United States Patent
Falkenstein

(10) Patent No.: US 8,419,590 B2
(45) Date of Patent: Apr. 16, 2013

(54) METHOD FOR OPERATING A HYBRID DRIVE OF A MOTOR VEHICLE

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 827 days.

(21) Appl. No.: 12/442,398

(22) PCT Filed: Jul. 25, 2007

(86) PCT No.: PCT/EP2007/057681
§ 371 (c)(1),
(2), (4) Date: Nov. 10, 2009

(87) PCT Pub. No.: WO2008/034661
PCT Pub. Date: Mar. 27, 2008

(65) Prior Publication Data
US 2010/0062896 A1    Mar. 11, 2010

(30) Foreign Application Priority Data
Sep. 21, 2006  (DE) .......................... 10 2006 044 427

(51) Int. Cl.
*B60K 1/02*    (2006.01)
(52) U.S. Cl.
USPC ................................ 477/3; 903/907; 903/944
(58) Field of Classification Search ................ 477/3, 7, 477/16; 180/65.21, 65.265, 65.28, 65.285, 180/65.31; 903/903, 907, 915, 930, 944
See application file for complete search history.

(56) References Cited

U.S. PATENT DOCUMENTS

| | | | |
|---|---|---|---|
| 6,116,368 A * | 9/2000 | Lyons et al. | 180/165 |
| 7,305,873 B2 * | 12/2007 | Hubbard et al. | 73/114.11 |
| 7,523,797 B2 * | 4/2009 | Kimura et al. | 180/65.25 |
| 8,145,375 B2 * | 3/2012 | Hsieh et al. | 701/22 |
| 2003/0088343 A1 * | 5/2003 | Ochiai et al. | 701/22 |
| 2004/0235613 A1 * | 11/2004 | Aoki et al. | 477/3 |
| 2005/0003925 A1 * | 1/2005 | Wakashiro et al. | 477/2 |

FOREIGN PATENT DOCUMENTS

| | | |
|---|---|---|
| DE | 102 61 278 A1 | 7/2004 |
| DE | 10 2004 048606 A1 | 4/2006 |
| GB | 2 353 984 A | 3/2001 |
| WO | WO 97/08008 A | 3/1997 |

OTHER PUBLICATIONS

International Search Report, PCT International Patent Application No. PCT/EP2007/057681, dated Jul. 25, 2007.

* cited by examiner

*Primary Examiner* — Justin Holmes
(74) *Attorney, Agent, or Firm* — Kenyon & Kenyon LLP

(57) ABSTRACT

A method is provided for operating a hybrid drive of a motor vehicle which has a combustion engine, at least one electrical machine, and at least one electrical accumulator, the electrical machine and the electrical accumulator belonging to an electrical system of the motor vehicle. The following steps are provided for implementing the method: subdividing the operation of the electrical machine into adjacent subranges of a) transient compensation operation, b) boost and/or recuperation operation, and c) operation for maintaining the vehicle electrical system; assigning torque limits and/or power output limits of the electrical machine in at least two subranges; and, releasing and/or influencing the particular torque limits and/or power output limits of the subranges as a function of the current state of the electrical accumulator and/or of the electrical machine and/or of the vehicle electrical system.

9 Claims, 2 Drawing Sheets

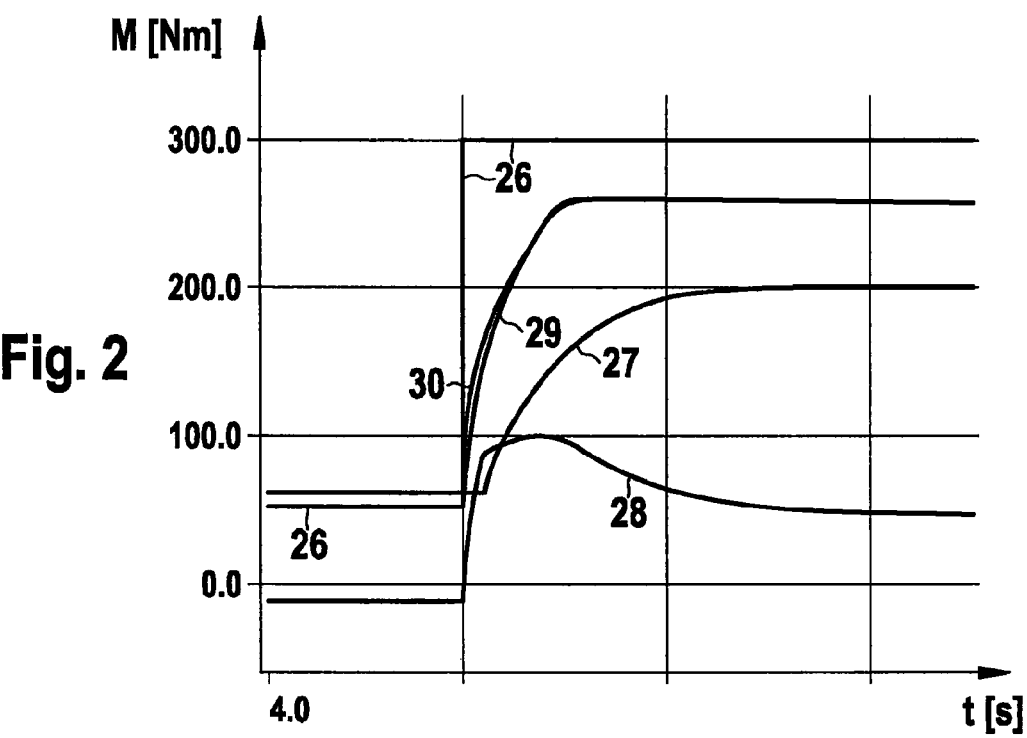
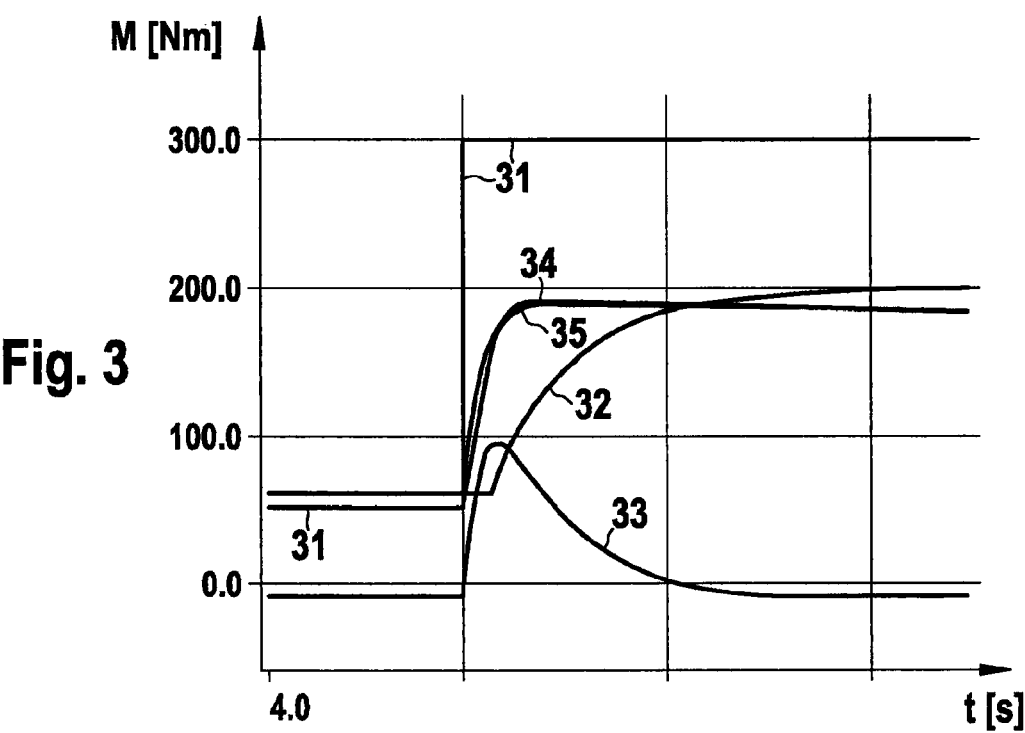

METHOD FOR OPERATING A HYBRID DRIVE OF A MOTOR VEHICLE

FIELD OF THE INVENTION

The present invention relates to a method for operating a hybrid drive of a motor vehicle which has a combustion engine, at least one electrical machine, and at least one electrical accumulator, the electrical machine and the electrical accumulator belonging to an electrical system of the motor vehicle.

BACKGROUND INFORMATION

A method for operating a hybrid drive of a motor vehicle is generally known. In this context, the hybrid drive is designed, in particular, as a parallel hybrid drive, in which case a drivetrain of the motor vehicle includes a combustion engine and an electrical machine. They are permanently coupled to one another via a switchable separating clutch. If a separating clutch is provided, in addition to the operating modes of a hybrid driving, a boost operation and a recuperation operation, the drivetrain makes possible a purely electrical driving. The at least one electrical machine also has the task of supplying an electrical accumulator and an electrical system of the motor vehicle with the requisite electrical energy. In the case of high torque demand input by the driver, the combustion engine is assisted by the electrical machine. This so-called boost operation is only temporarily feasible (over the medium term) since energy is withdrawn from the electrical energy accumulator in the process. In addition, the electrical machine renders possible a recuperation operation, in which, during a deceleration of the vehicle, kinetic energy is converted into electrical energy by regenerative operation of the electrical machine. Moreover, the electrical machine is utilized to compensate for a delayed response of the combustion engine to a torque demand. A delayed response occurs, for example, in the context of what is generally referred to as turbo lag, or due to the limited airpath dynamics of the combustion engine. For the most part, combustion engines, in particular, Otto engines having manifold injection, have an electronic throttle valve for regulating the air mass flow rate. The gas pedal is mechanically decoupled from this electronic throttle valve.

The finite setting speed of the throttle valve actuator and the dynamic charge effects in the intake manifold (airpath) do not permit a highly dynamic adjustment of a predefined air mass flow rate and of the thereby generated combustion engine torque. In contrast to the airpath, an intervention into the ignition timing and a reduction in the combustion engine torque associated therewith can be effected virtually without delay. However, retarding the ignition timing to a later ignition point degrades the efficiency of the combustion engine and increases the fuel consumption and the exhaust emissions. The torque control of the electrical machine exhibits a dynamic response which is substantially greater than the turbo lag of a Diesel engine or the intake manifold dynamics of an Otto engine. For that reason, the electrical machine is used in the short- and medium-term operation to supplement the combustion engine. This supplementation must be coordinated in a way that ensures the operation of the vehicle electrical system over the long term.

SUMMARY

The method according to the present invention includes the following steps:

subdividing the operation of the electrical machine into adjacent subranges
 a) transient compensation operation,
 b) boost and/or recuperation operation, and
 c) operation for maintaining the vehicle electrical system;
assigning torque limits and/or power output limits of the electrical machine to at least two subranges; and
releasing and/or influencing the particular torque limits and/or power output limits of the subranges as a function of the current state of the electrical accumulator and/or of the electrical machine and/or of the vehicle electrical system.

Thus, an example method according to the present invention provides for a coordination of torque and, respectively, power output for a hybrid drive which suitably apportions a nominal torque, respectively a nominal power output of the hybrid drive between the combustion engine and the electrical machine. In this context, the supplying of the vehicle electrical system is ensured over the long term in the operation for maintaining the electrical system operation. In addition—depending on the current state (such as charge state, temperature, remaining service life) of the electrical accumulator—a boost and/or recuperation operation, as well as a transient compensation operation are temporarily permitted. To that end, the operating range of the electrical machine is subdivided into subranges (transient compensation operation, boost and/or recuperation operation, and operation for maintaining the vehicle electrical system). At least two subranges have individual torque limits and/or power output limits of the electrical machine assigned thereto. In this manner, independent torque limits and/or power output limits are set for the individual tasks of the electrical machine.

The releasing and/or influencing of the particular torque limits and/or power output limits of the subranges are/is carried out as a function of the current state of the electrical accumulator. Moreover, the state of the electrical machine (for example, temperature) and/or the state of the vehicle electrical system (for example, switching on of an electrical system load) may influence the torque limits and/or power output limits. In this context, the topmost priority is the long-term supplying of the vehicle electrical system in accordance with a charging strategy of the electrical accumulator. As a function of this charging strategy, the individual torque limits and/or power output limits of the other subranges are released or blocked and/or influenced. The method enhances the driving dynamics in the boost operation and improves the ride comfort in the transient compensation operation. In an embodiment of the present invention, all of the variables, which subsequently relate to torques, may alternatively also relate to power output.

Example embodiments of the present invention provide that the transient compensation operation be a short-term operation; that the boost and/or recuperation operation be a medium-term operation; and that the operation for maintaining the vehicle electrical system be a long-term operation. This subdivision into short-term, medium-term and long-term operation establishes characteristic operating times for the transient compensation operation, for the boost and/or recuperation operation, and for the operation for maintaining the vehicle electrical system. Upon completion of this characteristic operating time, the operation corresponding to the subrange is ended.

Example embodiments of the present invention provide that the short-term operation last maximally two seconds; the medium-term operation maximally one minute; and the long-term operation for longer than one minute. Generally, the transient compensation operation requires an operating time of maximally two seconds since the time constants of the dynamics of the combustion engine—for example, of the manifold dynamics of an Otto engine—are significantly below this maximum operating time. The limitation of the operating time of the boost and/or recuperation operation is derived from the duration of a typical acceleration process of a motor vehicle (for example, in the case of a passing maneuver) and from the existing quantity of energy stored in the electrical accumulator. Alternatively to the medium-term operation being limited to maximally one minute, the medium-term operation may be reduced to a maximum operating time that is dependent on the state of the electrical accumulator.

Example embodiments of the present invention provide that a transition of the torque limit and/or power output limit to a lower or higher torque limit and/or power output limit take place continuously. Upon completion of the maximum operating time, the torque limit and/or power output limit are/is "gently" and continuously regulated downward. In the process, an abrupt downward regulation is avoided, in particular, since this would cause torque jumps and/or power output jumps in the transient compensation operation which should especially be avoided in such an operation. In the boost and/or recuperation operation, the torque or the power output is likewise regulated downward continuously, thereby preventing the motor vehicle from suddenly losing torque and/or power output in a passing maneuver or in another situation typical of the boost operation which would cause dangerous traffic situations.

Example embodiments of the present invention provide at least one further subrange. A corresponding torque limit and/or power limit is assigned to the electrical machine in this subrange. In the process, this further subrange is integrated into the subdivision of the operating range according to its operating time.

Example embodiments of the present invention provide for the further subrange to be an external operation in which an external intervention into the hybrid drive takes place. Such an intervention may be carried out, for example, by an electronic stability program (ESP) or an automatic transmission.

In embodiments of the present invention, it is advantageously provided that the particular torque limits and/or power output limits of the subranges be released and/or influenced in sequence, one after another, for subranges having ever greater torque limits and/or power output limits. In this context, the subranges are arranged in the sequence of the signal flow in such a way that subranges having high torque limits and/or power output limits reside further back than subranges having lower torque limits and/or power output limits. The torque limits and/or power output limits of each subrange that resides further back in the sequence of the signal flow may be additionally dependent on signals of the subranges residing ahead of the same.

In embodiments of the present invention, it is furthermore provided that the particular torque limits and/or power output limits of the subranges be released and/or influenced in sequence, one after another, for subranges having ever shorter operating times. The operating time, during which the individual subrange influences the torques, preferably decreases in the sequence of the signal flow. Thus, the energy conversions influenced by the individual subranges and their corresponding coordination stages also decrease in the sequence of the signal flow. This also occurs, in particular, for a releasing and/or influencing sequence in which the subranges exhibit ever greater torque limits and/or power limits in the sequence of the signal flow. The transient compensation operation preferably resides in the signal flow behind the boost and/or recuperation operation. If the limits for the boost and/or recuperation operation are already regulated down, for example, due to too low of an energy content of the electrical accumulator, the torque limits and/or power output limits are still open for the transient compensation operation. This is possible since, in the case of the (short-term) transient compensation of the transient operation, the converted energy is low in comparison to the (medium-term) boost and/or recuperation operation. Thus, the transient compensation operation also remains active in the context of a boost and/or recuperation operation which has been regulated down. For a (short-term) transient compensation, the electrical machine may be operated in the overload range, while a (medium-term) boost operation only utilizes the continuous load limits. Depending on the duration of the load, appropriately graduated limits may be necessary, for example, to improve or to maintain the service life of the electrical accumulator.

In embodiments of the present invention, it is provided that the electrical machine be utilized as a generator and as an electric motor for the hybrid drive. Given a proper use, there is no need for a separate generator to maintain the vehicle electrical system or to charge the electrical accumulator.

BRIEF DESCRIPTION OF THE DRAWINGS

FIG. 2 shows a step response of the resulting actual torque of the hybrid drive to a jump in the nominal torque given a released boost operation.

FIG. 3 shows a step response of the resulting actual torque of the hybrid drive to a jump in the nominal torque given an unreleased boost operation.

DETAILED DESCRIPTION

Figure 1:
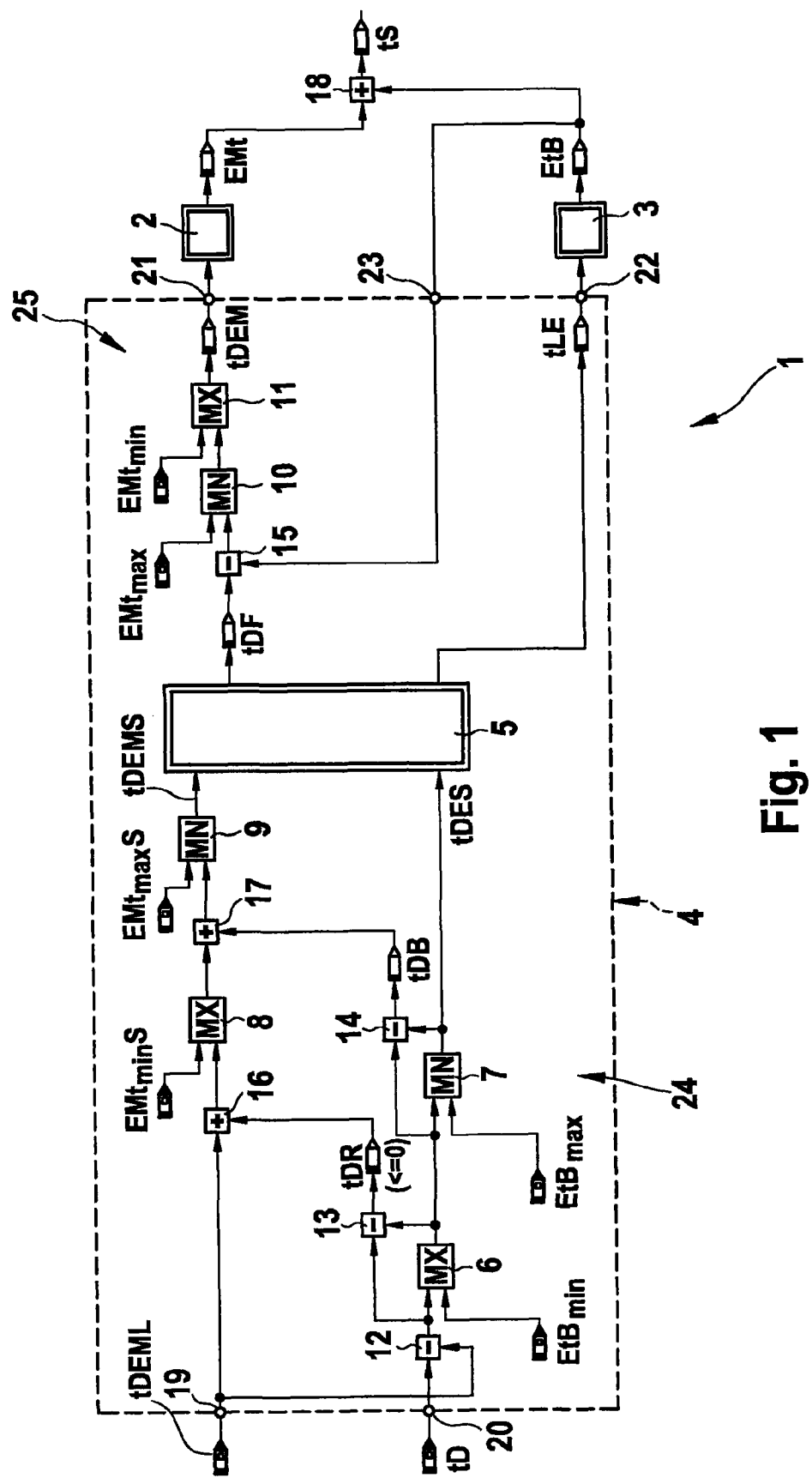
FIG. 1 shows a block diagram of a simulation of a hybrid drive having a control device for implementing a method according to the present invention.

FIG. 1 shows a block diagram of a simulation of a hybrid drive 1 having two driving motors 2, 3, the first driving motor being designed as an electrical machine 2 and the second driving motor as combustion engine 3. Driving motors 2, 3 are controlled in a coordinated process by a coordinating control device 4 having a ride comfort filter 5, a plurality of comparator units 6, 7, 8, 9, 10, 11, a plurality of subtraction units 12, 13, 14, 15, and a plurality of adder units 16, 17. Comparator units 6, 8, 11 compare two input values and output the higher input value as an output value; comparator units 7, 9, 10 output the lower input value. The actual torques (combustion-engine base torque EtB and electric-machine actual torque EMt) are summed via a transmission 18 to form an output torque (hybrid-drive summed torque) tS. Control device 4 has an input 19 for receiving the signal of a torque selection for the charging strategy used in the operation for maintaining the vehicle electrical system tDEML. In addition, control device 4 has an input 20 for receiving a signal of a nominal torque tD. This nominal torque tD may come, for example, from a gas pedal via which the driver of the motor vehicle specifies a driver-input torque. At its output 21, control device 4 outputs a signal that is proportional to electric-machine nominal torque tDEM to electric machine 2 and a signal that is proportional to combustion-engine nominal torque tLE to combustion engine 3. At input 23, a signal that is proportional to combustion-engine base torque EtB is fed back to control device 4. Via input 20, the driver specifies a nominal torque tD for hybrid-drive summed torque tS. An ignition-timing intervention in combustion engine 3 does not take place in the example discussed here. Thus, the actual torque of combustion engine 3 corresponds to combustion-engine base torque EtB which is generated in the context of an ideal ignition timing. Base torque EtB is dependent on the air charge and follows combustion-engine nominal torque tLE with a delay due to the limited airpath dynamics. The response of combustion-engine nominal torque tLE to base torque EtB is approximately simulated in block 3 (combustion engine) by a series connection of a dead-time element having a dead time of 80 ms and a PT1 element having a time constant of 200 ms. In comparison to combustion engine 3, the torque control of electrical machine 2 is carried out highly dynamically. The response of electric-machine nominal torque tDEM to electric-machine actual torque Emt is approximately modeled in block 2 (electrical machine) by a PT1 element having a time constant of 20 ms. Combustion-engine actual torque EtB and electric-machine actual torque EMt are summed to form summed torque tS.

As a function of the energy demand of the vehicle electrical system and other influencing variables, an operating/charging strategy ascertains a torque selection of a nominal torque tDEML for electrical machine 2. The operating/charging strategy, which is not described in greater detail here, functions optimally in terms of consumption and is optimized in terms of low exhaust emissions. The ascertainment of nominal torque tDEML constitutes one part of the first subrange of the operating range of the electrical machine (operation for maintaining the vehicle electrical system). In this context, one first set of (long-term) torque limits and/or power output limits may be considered. The torque selection of charging strategy tDEML is added in a first coordination stage having an inverted sign to nominal torque tD input by the driver; the sum yields a nominal torque for combustion engine 3. If the driver requests a very high nominal torque tD of hybrid drive 1, the thus ascertained combustion-engine nominal torque exceeds combustion-engine base torque $EtB_{max}S$ that is maximally possible at the current speed and at steady-state operation. In this context, a boost torque tDB is generated which assumes a value greater than or equal to zero. By way of the illustrated transverse path, boost torque tDB is additionally applied to the electric machine via adder unit 17. A further limitation limits the thus ascertained torque selection of electrical machine 2 to torque limit $EMt_{max}S$ that is valid for the boost operation (medium term). During the boost operation, torque selection tDEML of the charging strategy is not observed since additional boost torque tDB is active. In this context, the limited energy content of the electrical energy accumulator generally decreases. To avoid a too vigorous discharging and to achieve a reproducibility, a downward regulation in the boost operation is provided once the operating time of the boost operation has ended. The boost operation is regulated down by reducing torque limit $EMt_{max}S$ that is valid for the boost operation; a complete downward regulation results when $EMt_{max}S=tDEML$.

An corresponding approach is provided for recuperating the boost and/or recuperation operation using a (medium-term) torque limit $EMt_{min}S$ that is valid for the recuperation and a minimum combustion-engine base torque $EtB_{min}$, a recuperation torque tDR being thereby derived. Measures for the coordinated transition to the ignition-timing retard, respectively trailing throttle fuel cutoff given a negative combustion-engine nominal torque are not described. Thus, in the second subrange of the operating range of electrical machine 2 (coordination stage for the boost and/or recuperation operation), a second set of (medium-term) torque limits and/or power output limits of electrical machine 2, composed of $EMt_{max}S$ and $EMt_{min}S$, applies. A continuous transition between the charging strategy, the boost operation, and the recuperation is derived from the torque coordination implemented by control device 4, as illustrated in FIG. 1. An abrupt change in hybrid-drive nominal torque tD results in abrupt variations in the signals in a second coordination stage 24 assigned to the boost and/or recuperation operation. This second coordination stage 24 specifies nominal torques tDEMS and tDES as "target values" for driving motors 2, 3. For reasons relating to ride comfort, these target values tDEMS and tDES should be set as filtered values, for example, in order to avoid exciting vibrations in the drivetrain. Decisive in this context is hybrid-drive summed torque tS. To this end, ride comfort filter 5 ascertains a filtered, summed nominal torque tDF which, in steady-state operation, corresponds to the sum of the outputs of second coordination stage 24, for steady-state operation, it holding that $$tDF = tDEMS + tDES.$$

Nominal torque tDF deviates dynamically from the sum of nominal torques (tDEMS+tDES) output by the second coordination stage. Due to the distinct dynamic behavior of combustion engine 3—of the intake manifold dynamics—a combustion-engine nominal torque tLE that is specially coordinated therewith and having a corresponding dynamic characteristic is ascertained by the drive comfort filter. In steady-state operation, it holds that $$tLE = tDES$$

and, thus, for combustion-engine base torque EtB (combustion-engine actual torque) that $$EtB = tLE = tDES.$$

The transient compensation of the transient compensation operation, in which subtraction unit 15 generates the difference between the actual torque of combustion engine EtB and filtered, summed nominal torque tDF, is carried out in the exemplary embodiment. An ignition-timing intervention in combustion engine 3 does not take place in the example discussed here. Measures required for this purpose are not illustrated in FIG. 1. The thus formed third coordination stage 25 for the transient compensation operation has a separate set of (short-term) torque limits and/or power output limits (only torques being considered in FIG. 1) composed of $EMt_{max}$ and $EMt_{min}$, where $$EMt_{min} \leq EMt_{min}S \leq tDEML \leq EMt_{max}S \leq EMt_{max}.$$

FIG. 2 shows a diagram where the functions of nominal torque tDF, of combustion-engine actual torque EtB, of electric-motor actual torque EMt and of hybrid-drive total torque tS are represented, the time in seconds (s) being plotted on the abscissa, and the torques in newton meters (Nm) being plotted on the ordinate. In this context, FIG. 2 shows a positive jump in nominal torque tD specified by the driver from 50 Nm to 300 Nm. The limits of the coordination stages reside at $EMt_{max}S=50$ Nm, $EMt_{max}=100$ Nm; the maximum possible base torque is $EtB_{max}=200$ Nm; nominal torque tDEML=−10 Nm. The assumption is that the speed varies only slightly during the boost and/or recuperation operation and, thus, that the torque limits remain constant. Given nominal torque tD=50 Nm, electric-machine nominal torque tDEML=−10 Nm may be observed; it holds that tDEMS=−10 Nm and that tDES=60 Nm for combustion-engine nominal torque tDES at the input of ride-comfort filter. The transition to the boost operation occurs in response to the jump in nominal torque tD to 300 Nm. The mentioned torque limits yield jumps in electric-motor nominal torque tDEMS to 50 Nm and in combustion-engine nominal torque tDES to 200 Nm, summed nominal torque tDF filtered by ride-comfort filter 5 exhibiting an asymptotic curve toward the sum of these two nominal torques—i.e., toward a total torque of 250 Nm. Actual torque of combustion engine EtB increases to 200 Nm in conformance with intake manifold dynamics (simulated by the assumption of a dead time and the curve progression of a PT1 element) and asymptotically approaches nominal torque (the target value) tDES. For the transient compensation (short-term), electric-machine actual torque EMt increases to maximum electric-machine actual torque $EMt_{max}$=100 Nm (as a limit) and thus compensates for the delayed build-up of combustion-engine actual torque EtB, and then decreases—as desired—to (medium-term) boost limit $EMt_{max}S$ of 50 Nm. Summed torque tS corresponds in good approximation to filtered, summed nominal torque tDF. A high-level dynamics is thereby achieved. At point in time t=4.5 s, nominal torque tD (function 26) shows a jump from 100 to 300 Nm. Resulting combustion-engine base torque EtB (function 27) and electric-machine actual torque Emt (function 28) complement one another, resulting in hybrid-drive summed torque tS (function 29). In this context, function 29 essentially corresponds to the characteristic curve of filtered nominal torque tDF (function 30).

FIG. 3 shows a corresponding jump in nominal torque tD (function 31) input by the driver, however, given a boost operation which has been regulated down. In the case that $$EMt_{max}S=tDEML=-10\ Nm,$$

it holds for the illustrated period of time that $$tDEMS=-10\ Nm$$

Combustion-engine base torque EtB (function 32) corresponds to function 27 of the diagram of FIG. 2. Electric-motor actual torque EMt (function 33) merely increases for the transient compensation (short-term) and then returns to −10 Nm, so that resulting hybrid-drive summed torque tS (function 34), which essentially corresponds to the nominal torque following filtration tDF (function 35), increases to 190 Nm in accordance with the transient compensation operation. Thus, FIG. 3 shows that, in accordance with the present invention, the transient compensation also takes place in the case of a boost operation which has been regulated down.

What is claimed is:

1. A method for operating a hybrid drive of a motor vehicle which has a combustion engine, at least one electrical machine, and at least one electrical accumulator, the electrical machine and the electrical accumulator belonging to an electrical system of the motor vehicle, comprising:
    subdividing the operation of the electrical machine into adjacent subranges of a) transient compensation operation, b) boost and/or recuperation operation, and c) operation for maintaining the vehicle electrical system;
    assigning torque limits and/or power output limits of the electrical machine in at least two subranges; and
    releasing and/or influencing the particular torque limits and/or power output limits of the subranges as a function of the current state of the electrical accumulator and/or of the electrical machine and/or of the vehicle electrical system,
    wherein a transition of the torque limit and/or power output limit to a lower or higher torque limit and/or power output limit takes place continuously.

2. The method as recited in claim 1, wherein the particular torque limits and/or power output limits of the subranges are released and/or influenced in sequence, one after another, for subranges having ever greater torque limits and/or power output limits.

3. The method as recited in claim 1, wherein the particular torque limits and/or power output limits of the subranges are released and/or influenced in sequence, one after another, for subranges having ever shorter operating times.

4. The method as recited in claim 1, wherein the electrical machine is utilized as a generator and as an electric motor of the hybrid drive.

5. The method as recited in claim 1, wherein the transient compensation operation is a short-term operation; the boost and/or recuperation operation is a medium-term operation; and the operation for maintaining the vehicle electrical system is a long-term operation.

6. The method as recited in claim 5, wherein the short-term operation lasts maximally two seconds; the medium-term operation maximally one minute; and the long-term operation for longer than one minute.

7. The method as recited in 1, wherein at least one further subrange is provided, a corresponding torque limit and/or power limit being assigned to the electrical machine in this subrange.

8. The method as recited in claim 7, wherein the further subrange is an external operation in which an external intervention into the hybrid drive takes place.

9. A method for operating a hybrid drive of a motor vehicle which has a combustion engine, at least one electrical machine, and at least one electrical accumulator, the electrical machine and the electrical accumulator belonging to an electrical system of the motor vehicle, comprising:
    subdividing the operation of the electrical machine into adjacent subranges of a) transient compensation operation, b) boost and/or recuperation operation, and c) operation for maintaining the vehicle electrical system;
    assigning torque limits and/or power output limits of the electrical machine in at least two subranges; and
    releasing and/or influencing the particular torque limits and/or power output limits of the subranqes as a function of the current state of the electrical accumulator and/or of the electrical machine and/or of the vehicle electrical system,
    wherein the transient compensation operation is a short-term operation; the boost and/or recuperation operation is a medium-term operation; and the operation for maintaining the vehicle electrical system is a long-term operation,
    wherein the short-term operation lasts maximally two seconds; the medium-term operation maximally one minute; and the long-term operation for longer than one minute.

* * * * *

UNITED STATES PATENT AND TRADEMARK OFFICE
CERTIFICATE OF CORRECTION

PATENT NO. : 8,419,590 B2 Page 1 of 1
APPLICATION NO. : 12/442398
DATED : April 16, 2013
INVENTOR(S) : Jens-Werner Falkenstein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this
First Day of September, 2015

Michelle K. Lee
*Director of the United States Patent and Trademark Office*